United States Patent [19]

Semenova et al.

[11] Patent Number: 5,569,427
[45] Date of Patent: Oct. 29, 1996

[54] HIGH TEMPERATURE COATING ON CERAMIC SUBSTRATE AND NON-FIRING PROCESS FOR OBTAINING SAME

[75] Inventors: Elena V. Semenova; Vladimir M. Tjurin; Stanislav S. Solntsev; Alexei Y. Bersenev, all of Moscow, Russian Federation

[73] Assignees: Aerospatiale Societe Nationale Industrielle, Paris, France; VIAM - All Russian Institut of Aviation Materials, Moscow, Russian Federation

[21] Appl. No.: 404,919

[22] Filed: Mar. 16, 1995

[30] Foreign Application Priority Data

Mar. 16, 1994 [FR] France ................... 94 03048

[51] Int. Cl.⁶ ................... B29C 59/00; B05D 3/02
[52] U.S. Cl. ................... 264/129; 264/60; 264/131; 427/352; 427/379; 427/380; 106/286.8; 106/287.17; 106/287.34
[58] Field of Search ................... 264/60, 129, 131; 427/352, 376.1, 376.2, 379, 380; 106/286.8, 287.34; 501/32; 156/278, 279

[56] References Cited

U.S. PATENT DOCUMENTS

| | | | |
|---|---|---|---|
| 5,066,330 | 11/1991 | Holcombe, Jr. et al. | 106/287.34 |
| 5,079,082 | 1/1992 | Leiser et al. | |
| 5,240,488 | 8/1993 | Chandross et al. | 65/3.11 |
| 5,296,288 | 3/1994 | Kourtides et al. | 428/262 |
| 5,405,706 | 4/1995 | Kirkwood et al. | 428/547 |

OTHER PUBLICATIONS

Database WPI, Section Ch, Week 8813, 1987.

*Primary Examiner*—David A. Simmons
*Assistant Examiner*—M. Curtis Mayes
*Attorney, Agent, or Firm*—Burns, Doane, Swecker & Mathis, L.L.P.

[57] ABSTRACT

A process for producing a low porosity, high temperature coating on a porous substrate based on ceramic fibers of refractory compounds. The coating comprises from 30.8 to 41.9 weight % of silica ($SiO_2$) from a silica sol, from 30.2 to 49.4 weight % of alumina ($Al_2O_3$), from 4.0 to 16.3 weight % of silicon carbide (SiC), and from 11.6 to 16.6 weight % of molybdenum disilicide ($MoSi_2$). The coating has an emissivity of not less than 0.8 and an operating temperature of up to 1500° C. The process is carried out without a firing step and includes the steps of preparing a slurry comprising from 65 to 75 weight % of a silica sol having a content of 20 to 50 weight % of $SiO_2$ and from 25 to 35 weight % of a mixture of particles of the refractory compounds $Al_2O_3$, SiC, and $MoSi_2$; applying the slurry to the ceramic fiber based porous substrate to form a layer of the slurry on the substrate; and drying the layer in several steps, first at ambient temperature, then at a temperature of 90° to 100° C., and then at a temperature of 200° to 220° C. until a constant weight of the coated substrate is obtained. The mixture contains from 52 to 71 weight % of $Al_2O_3$, from 6 to 28 weight % of SiC, and from 20 to 25 weight % of $MoSi_2$.

3 Claims, No Drawings

HIGH TEMPERATURE COATING ON CERAMIC SUBSTRATE AND NON-FIRING PROCESS FOR OBTAINING SAME

FIELD OF THE INVENTION

The present invention relates to high temperature resistant composites, referred to hereinafter as "high temperature composites" and, more especially to coatings based on a glassy, glass-ceramic or ceramic matrix and on refractory, high strength fibers and/or whiskers.

Such coatings are widely used in thermal protection systems for aerospace and hypersonic aircrafts.

BACKGROUND OF THE INVENTION

There are known porous coatings referred to as TUFI (Toughened Unipiece Fibrous Insulation) used for thermal insulation and which comprise high silica borosilicate (77.5 weight %) based RCG glass (Reaction Cured Glass; research conducted by the NASA Research Center), silicon tetraboride (2.5 weight %) and molybdenum disilicide ((20 weight %) (D. B. Laiser et al., Advanced Porous Coating for Low-Density Ceramic Insulation Materials, J. Amer. Ceram. Soc., vol. 72, No. 6, pages 1003–1010, 1989). The ceramic substrate used is an AETB (Alumina Enhanced Thermal Barrier) type material comprising amorphous silica ($SiO_2$) fibers (40 to 85 weight %), aluminoborosilicate fibers (10 weight %) and alumina fibers (5 to 50 weight %). The coating is prepared using slurry coating-firing techniques, including fine milling of the said components, blending them with ethanol as carrier, applying the slurry thus obtained to the surface of the substrate by spraying using a spray gun, and drying and firing the coating at 1220° C.

One drawback of said coating on a ceramic substrate lies in its low operating temperature, namely 1260° C. In a dissociated air flow, at a temperature in excess of 1400° C., bubbles or blisters form therein.

There are also known high alumina ceramic material based coatings comprising 80 to 95 weight % of aluminoborosilicate type glass, the composition (in weight %) of the glass being:

| | |
|---|---|
| $B_2O_3$ | 17 to 28 |
| $Al_2O_3$ | 3 to 11 |
| $SiO_2$ | balance, | and 5 to 20 weight % of fibrous single crystal aluminum oxide ($Al_2O_3$ whiskers) [M. V. Sazonova et al., Coating composition, Inventor's certificate SU 1 331 846 (classification CO3 c 8/24) filed on 21st. Jun. 1985 and published on 23rd. Aug, 1987 (Bulletin No. 31)].

The coating is prepared using slurry coating-firing techniques.

The slurry is prepared using a 50% solution of ethanol in water and is applied to a porous material by brushing with a brush, or by spraying using a spray gun. The coated material is dried at a temperature of 100° to 150° C., and then fired at a temperature of 1300° to 1350° C. for 5 to 15 minutes.

One drawback of this coating on a fibrous ceramic substrate is its low erosion resistance. In an air flow at a temperature of 1300° to 1350° C., ablation is 0.2 to 0.4 g/m².

To form coatings having a higher operating temperature, it is necessary to use more refractory oxide based materials. At the same time, it is necessary to ensure the absence of shrinkage and distortion of the fibrous ceramic substrate during formation of the coating.

These problems can be overcome by using a sol-gel technology which makes it possible to develop protective coatings based on refractory oxides such as $SiO_2$, $Al_2O_3$, $ZrO_2$, etc. on glass, ceramic or metal substrates.

The process for producing coatings using the sol-gel technology includes the steps consisting of preparing a solution of organometallic compounds comprising, in particular, alkoxides, which can be subjected to gelation in a controlled manner, applying this solution to a substrate, usually by immersing the substrate in the solution and removing it from the said solution at a perfectly controlled uniform speed, slowly drying the resulting gel to form a porous film and subsequently densifying it by heating at temperatures of 200° to 700° C.

This process makes it possible to obtain a layer with one or more components, which layer imparts specific properties to the surface to be coated.

However, if only solutions of organometallic compounds or sols are used, it is impossible to obtain a continuous or low porosity coating on the surface of a highly porous material.

This problem can be overcome by introducing into the sol a powdery filler which forms the skeleton of the coating.

There is known a coating referred to as "C-9", prepared by the American company Rockwell Intern., Space Transportation Systems Div., for flexible insulation of the AFRSI (Advanced Flexible Reusable Surface Insulation) type, based on silica fibers and comprising 47 weight % of colloidal silica and 53 weight % of ground (powder form) silica.

This coating is prepared by applying to the surface of the fibrous material a mixture of colloidal silica solution or sol (Ludox® A.S. produced by Du Pont de Nemours) and of amorphous silica powder, to which isopropyl alcohol is added to impart better wettability to the surface of the fibrous material [D. Mui, H. M. Clancy, Development of a Protective Ceramic Coating for Shuttle Orbiter Advanced Flexible Reusable Surface Insulation (AFRSI), Ceram. Eng. Sci., Proc., vol. 6, Nos. 7–8, pages 793–805, 1985].

The "C-9" coating, which comprises amorphous silica, has a low thermal expansion coefficient but, owing to the presence of silica, it is only compatible with a quartz fiber based substrate. Furthermore, at temperatures above 1000° C., amorphous silica, in the absence of a crystallisation inhibitor such as boron, for example, tends to crystallise with the formation of cristobalite, which leads to reduced heat resistance.

SUMMARY OF THE INVENTION

The object of the invention is thus to provide a low porosity high temperature coating on a porous substrate based on ceramic fibers constituted by refractory compounds and which has an operating temperature of up to 1500° C.

Another object of the invention is to provide a nonfiring process, to obtain a high temperature coating possessing the aforementioned properties.

According to one of its aspects, the invention provides a low porosity high temperature coating on a porous substrate based on ceramic fibers constituted by refractory compounds, characterized in that:

it is essentially constituted by silica ($SiO_2$) from a silica sol, and by alumina ($Al_2O_3$), silicon carbide (SiC) and molybdenum disilicide ($MoSi_2$) resulting from the mixture of particles of these compounds with the silica sol, in a slurry;

| | |
|---|---|
| $SiO_2$: | 30.8 to 41.9% |
| $Al_2O_3$: | 30.2 to 49.4% |
| SiC: | 4.0 to 16.3% |
| $MoSi_2$: | 11.6 to 16.6%; | it has an emissivity of not less than 0.8; and it has an operating temperature of up to 1500° C.

According to another of its aspects, one of the objects of the invention is to provide a process for obtaining the coating defined hereabove, characterized in that it is carried out without a firing step and essentially comprises the steps of:

a) preparing a slurry composed of 65 to 75 weight % of a silica sol having a content of 20 to 50 weight % of $SiO_2$, and of 25 to 35 weight % of a mixture of particles of the refractory compounds $Al_2O_3$, SiC and $MoSi_2$, in the following weight proportions:

| | |
|---|---|
| $Al_2O_3$: | 52 to 71% |
| SiC: | 6 to 28% |
| $MoSi_2$: | 20 to 25%; | b) applying the said slurry to the ceramic fiber based porous substrate to be coated;

c) drying the layer applied in several steps, at ambient temperature (20° to 25° C. approximately), at a temperature of 90° to 100° C., and then at a temperature of 200° to 220° C. until a constant weight is obtained for the coated substrate.

The components of the slurry, other than the silica, can be used in the form of whiskers, fibers, powders or mixtures thereof.

The advantages of the composite coating material according to the invention are, in particular, high temperature initiation of strain (above 1100° C.), high thermochemical resistance and erosion resistance in a dissociated air flow at a surface temperature of up to 1500° C. and high emissivity, that is to say greater than or equal to 0.8. These characteristics make it possible to use with such a coating a porous fibrous substrate as an insulating material for aerospace and hypersonic aircrafts.

A further advantage of the invention is that it is possible to form the coating in question using a non-firing technique, which allows an aircraft to be coated directly, if necessary.

According to the invention, the ceramic substrate can be selected from the group formed by highly porous fibrous ceramics, in particular those based on silicon, aluminum, zirconium oxides, silicon carbide, silicon nitride or mixtures of such components.

Silica sol is used as a dispersive medium for the slurry from which a high temperature coating matrix is formed, by $SiO_2$ gel formation, and then densified and dehydrated by a drying process. The reduction in the $SiO_2$ sol content in the slurry to less than 65 weight % leads to thickening and to the formation of a non-uniform coating over the ceramic substrate, which can lead to cracking of the coating and to its partial peeling. On the other hand, an increase in the sol content to over 75 weight % leads to non-uniform impregnation of the surface of the substrate with the liquid slurry, i.e. to a reduction in the quantity of the coating.

The alumina particles form the skeleton of the high temperature coating and take up the bulk of the load or stresses applied when it is in operation.

An increase in the $Al_2O_3$ content of the slurry to more than 71 weight % and a reduction therein to less than 52 weight % lead to a reduction of the mechanical properties of the coating on the ceramic substrate owing to non-observance of the matrix-filler ratio.

Silicon carbide improves the sedimentation stability of the slurry, as well as binding of the skeleton of the composite coating and its mechanical properties. An increase in SiC content to over 28 weight % leads to excessive viscosity or thickness of the slurry and prevents its application to a ceramic substrate. A reduction in the SiC content of the slurry leads to a reduction of sedimentation stability.

Molybdenum disilicide imparts high emissivity to the coating on the ceramic substrate. A reduction of its content in the slurry to less than 20 weight % leads to a reduction in the emissivity of the coating. On the other hand, an increase in the $MoSi_2$ content to over 25 weight % in the slurry leads to its separation into layers at the expense of a high density homogeneous layer.

The following examples are intended to better explain the invention.

EXAMPLE 1

59 parts by weight of $Al_2O_3$ in powder form, 25 parts by weight of $MoSi_2$ in powder form and 16 parts by weight of SiC in powder form were placed in a polyethylene vessel together with alumina balls and mixed in a ring-roller mill for 2 hours. 32 parts by weight of the mixed components were placed in a glass vessel, 68 parts by weight of $SiO_2$ sol having an $SiO_2$ content of 34 weight % were added and the whole was mixed using a magnetic agitator for 15 minutes, until a uniform slurry had formed. The slurry obtained was applied to the surface of an $Al_2O_3$ fiber based fibrous ceramic material. The coated product was subjected to drying at ambient temperature for 2 hours, and then to drying at a temperature of 90° to 100° C. for 2 hours, and, finally, at a temperature of 200° to 220° C. until the weight of the product remained unchanged.

EXAMPLE 2

The following quantities of coating components, 71 parts by weight of $Al_2O_3$ in fiber form, 23 parts by weight of $MoSi_2$ in powder form and 6 parts by weight of SiC in powder form, were mixed according to the process of Example 1. 35 parts by weight of the components of the mixture and 65 parts by weight of $SiO_2$ sol with an $SiO_2$ content of 30 weight % were mixed in a glass vessel, as in Example 1. The resulting mixture was then applied to the surface of an article of SiC whisker based porous ceramic material. Drying was carried out as in Example 1.

EXAMPLE 3

The following quantities of coating components, 52 parts by weight of $Al_2O_3$ in powder form, 20 parts by weight of $MoSi_2$ in powder form and 28 parts by weight of SiC in whisker form, were mixed as in Example 1. 25 parts by weight of the components of the mixture and 75 parts by weight of $SiO_2$ sol having an $SiO_2$ content of 20% by weight were mixed as in Example 1 and applied to the surface of an $Si_3N_4$ whisker based material. The coated product was dried at ambient temperature for 3 hours, then at a temperature of 90° to 100° C. for 3 hours and, finally, at a temperature of 200° to 220° C. until its weight remained unchanged.

RESULTS

The coatings on ceramic substrates produced according to Examples 1 to 3 exhibited satisfactory thermochemical and erosion resistance in a plasma flow simulating aerothermal conditions of re-entry into the atmosphere at a surface temperature of 1500° C. - no evidence of bubbling, cracking or ablation were observed.

The integral hemispherical emissivity of these coatings at temperatures of up to 1500° C. was not less than 0.8. After heat treatment in a laboratory oven at 1500° C. for 3 hours, the surfaces of the coatings on the substrates remained unchanged and no cracking or spalling had occurred.

Furthermore, there was no shrinkage of the materials of the substrates.

What is claimed is:

1. A process for producing a low porosity, high temperature coating on a porous substrate based on ceramic fibers of refractory compounds, the coating comprising from 30.8 to 41.9 weight % of silica ($SiO_2$) from a silica sol, from 30.2 to 49.4 weight % of alumina ($Al_2O_3$), from 4.0 to 16.3 weight % of silicon carbide (SiC), and from 11.6 to 16.6 weight % of molybdenum disilicide ($MoSi_2$), and having an emissivity of not less than 0.8 and an operating temperature of up to 1500° C., the process is carried out without a firing step and comprises the steps of:

a) preparing a slurry comprising from 65 to 75 weight % of a silica sol having a content of 20 to 50 weight % of $SiO_2$ and from 25 to 35 weight % of a mixture of particles of the refractory compounds $Al_2O_3$, SiC, and $MoSi_2$, the mixture having the following weight proportions:

| | |
   |---|---|
   | $Al_2O_3$: | 52 to 71%, |
   | SiC: | 6 to 28%, and |
   | $MoSi_2$: | 20 to 25%; | b) applying the slurry to the ceramic fiber based porous substrate to form a layer of the slurry on the substrate; and c) drying the layer in several steps, first at ambient temperature, then at a temperature of 90° to 100° C., and then at a temperature of 200° to 220° C. until a constant weight of the coated substrate is obtained.

2. The process according to claim 6, wherein the $Al_2O_3$, SiC and $MoSi_2$ components of the slurry are added in the form of whiskers, fibers, powders, or mixtures thereof.

3. The process according to claim 1, wherein the porous substrate is formed of a highly porous fibrous ceramic of silicon oxide, aluminum oxide, zirconium oxide, silicon carbide, silicon nitride, or a mixture thereof.

* * * * *

UNITED STATES PATENT AND TRADEMARK OFFICE
CERTIFICATE OF CORRECTION

PATENT NO. : 5,569,427
DATED : October 29, 1996
INVENTOR(S) : Elena V. Semenova, et al.

It is certified that error appears in the above-indentified patent and that said Letters Patent is hereby corrected as shown below:

Column 2, line 29, please delete "(Advanced Flexible Reusable Surface Insulation)" and insert therefor --(Advanced Flexible Reusable Surface Insulation)--.

Column 3, line 2, after "slurry;", please insert a new line as follows:

--its weight composition is as follows:--.

Column 6, line 19 (claim 2, line 1), please delete "6" and insert therefor --1--.

Signed and Sealed this

Twenty-second Day of July, 1997

Attest:

BRUCE LEHMAN

Attesting Officer

Commissioner of Patents and Trademarks